Patented Apr. 15, 1930

1,754,457

UNITED STATES PATENT OFFICE

WILLIAM S. CALCOTT, OF PENNS GROVE, NEW JERSEY, AND HERBERT W. WALKER, OF WILMINGTON, DELAWARE, ASSIGNORS TO E. I. DU PONT DE NEMOURS & COMPANY, OF WILMINGTON, DELAWARE, A CORPORATION OF DELAWARE

NONCORROSIVE ALCOHOLIC SOLUTION

No Drawing. Application filed September 20, 1928. Serial No. 307,328.

This invention relates to agents adapted to inhibit the corrosion of iron and materials containing iron. More particularly it pertains to the use of certain compounds and admixtures thereof with solutions of the polyhydric alcohols to inhibit their corrosive action on iron.

As is well known, water solutions of the polyhydric alcohols attack metallic iron rapidly at ordinary temperatures and there is formed considerable rust on the metal and an iron oxide suspension and sediment in the solution.

We have found that if a small quantity of a mixture of a primary aromatic diamine, a higher fatty acid and a secondary diaromatic amine be dissolved in a polyhydric alcohol such as glycerine or ethylene glycol and the alcohol then diluted to any desired concentration with water, there results a mixture which does not readily corrode iron. The iron in contact with such a mixture remains inert and does not undergo the rusting which it does in aqueous solutions of these alcohols which contain no corrosion inhibitor.

For example, if a mixture of 1 part, by weight, of stearic acid, 1 part of meta-toluylene diamine and 2 parts of phenyl-a-naphthylamine be dissolved in glycerine or glycol, as ethylene glycol, in such quantity that the inhibitor constitutes about 0.1% of the final solution and water be added to the glycerine or ethylene glycol to make a 40% glycerine or ethylene glycol solution there results a mixture which has very little corrosive action on iron.

The introduction of inhibitors as described above results in markedly decreasing the rate of corrosion. The inhibitors are effective in hot as well as cold solutions and their use is therefore highly advantageous in preventing iron from rusting in storage tanks, cans, or drums and in automobile radiators where polyhydric alcohol solutions may be employed as anti-freeze solutions.

It is to be understood that the particular compounds mentioned above may be replaced by other compounds. Thus other higher fatty acids, as oleic and palmitic acids may be substituted for stearic acid. In place of m-toluylene diamine, other primary aromatic diamines as m-phenylene diamine, benzidine dianisidine, tolidine and the naphthalene diamines may be employed. In place of phenyl-a-naphthylamine, other secondary diaromatic amines as diphenylamine, the di-tolylamines, the di-xylylamines, tolyl-a-naphthylamine, diphenylethylene diamine, the dinaphthylamines as b-b-dinaphthylamine and a-b-dinaphthylamine may be employed.

Also, it will be understood that the proportions given above are merely illustrative and may be varied depending upon the particular conditions and the results desired.

Although in the preferred embodiment, a mixture of inhibiting agents, as described above, is employed, it is to be understood that the reagents may be employed separately. Thus, an aromatic diamine, as m-toluylene diamine, when introduced alone into an aqueous solution of a polyhydric alcohol will result in iron remaining free from scale and bright over a long period of exposure to the solution.

Likewise, the inhibitors may be employed with a mixture of polyhydric alcohols, or with a mixture of polyhydric alcohols and monohydric alcohols.

As many apparent and widely different variations may be made in the process and product, it is not our intention to be limited except as indicated in the appended claims.

We claim:

1. A non-corrosive aqueous solution of a polyhydric alcohol containing a primary aromatic diamine.

2. A non-corrosive aqueous solution of a polyhydric alcohol containing a primary aromatic diamine, a higher fatty acid and a secondary diaromatic amine.

3. A non-corrosive aqueous solution of a polyhydric alcohol containing m-toluylene diamine.

4. A non-corrosive aqueous solution of a polyhydric alcohol containing m-toluylene diamine, a higher fatty acid and a secondary diaromatic amine.

5. A non-corrosive aqueous solution of a polyhydric alcohol containing m-toluylene diamine, stearic acid and phenyl-a-naphthylamine.

6. The process of inhibiting the corrosive action of aqueous solutions of polyhydric alcohols on iron which comprises contacting said solution with iron in the presence of an aromatic diamine.

7. The process of inhibiting the corrosive action of aqueous solutions of polyhydric alcohols on iron which comprises contacting said solution with iron in the presence of a primary aromatic diamine, a higher fatty acid and a secondary diaromatic amine.

8. The process of inhibiting the corrosive action of aqueous solutions of polyhydric alcohols on iron which comprises contacting said solution with iron in the presence of m-toluylene diamine.

9. The process of inhibiting the corrosive action of aqueous solutions of polyhydric alcohols on iron which comprises adding to said solution with iron in the presence of m-toluylene diamine, stearic acid and phenyl-a-naphthylamine.

10. A non-corrosive aqueous solution of glycerine containing a primary aromatic diamine, a higher fatty acid and a secondary diaromatic amine.

11. A non-corrosive aqueous solution of glycerine containing m-toluylene diamine, stearic acid and phenyl-a-naphthylamine.

12. The process of inhibiting the corrosive action of aqueous solutions of glycerine on iron which comprises contacting said solutions with iron in the presence of meta-toluylene-diamine.

In testimony whereof we affix our signatures.

WILLIAM S. CALCOTT.
HERBERT W. WALKER.

CERTIFICATE OF CORRECTION.

Patent No. 1,754,457.                              Granted April 15, 1930, to

WILLIAM S. CALCOTT ET AL.

It is hereby certified that error appears in the printed specification of the above numbered patent requiring correction as follows: Page 2, line 19, claim 9, for the words "adding to" read "contacting"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.

CERTIFICATE OF CORRECTION.

Patent No. 1,754,457.                                                       Granted April 15, 1930, to

WILLIAM S. CALCOTT ET AL.

It is hereby certified that error appears in the printed specification of the above numbered patent requiring correction as follows: Page 2, line 19, claim 9, for the words "adding to" read "contacting"; and that the said Letters Patent should be read with this correction therein that the same may conform to the record of the case in the Patent Office.

Signed and sealed this 13th day of May, A. D. 1930.

(Seal)                                                           M. J. Moore,
Acting Commissioner of Patents.